United States Patent
Bshara et al.

(10) Patent No.: US 10,616,116 B1
(45) Date of Patent: *Apr. 7, 2020

(54) NETWORK TRAFFIC LOAD BALANCING USING ROTATING HASH

(71) Applicant: Amazon Technologies, Inc., Seattle, WA (US)

(72) Inventors: Nafea Bshara, San Jose, CA (US); Erez Izenberg, Tel-Aviv (IL); Said Bshara, Tira (IL); Brian William Barrett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,564

(22) Filed: Oct. 11, 2018

Related U.S. Application Data

(63) Continuation of application No. 15/194,312, filed on Jun. 27, 2016, now Pat. No. 10,103,992.

(51) Int. Cl.
*H04L 12/26* (2006.01)
*H04L 12/803* (2013.01)
*H04L 12/743* (2013.01)
*H04L 29/06* (2006.01)

(52) U.S. Cl.
CPC ........ *H04L 47/125* (2013.01); *H04L 45/7453* (2013.01); *H04L 69/22* (2013.01); *H04L 69/14* (2013.01)

(58) Field of Classification Search
None
See application file for complete search history.

(56) References Cited

U.S. PATENT DOCUMENTS

| | | | |
|---|---|---|---|
| 6,665,297 B1 | 12/2003 | Hariguchi et al. | |
| 7,554,914 B1 | 6/2009 | Li et al. | |
| 8,259,585 B1 | 9/2012 | S. P. et al. | |
| 10,103,992 B1* | 10/2018 | Bshara | H04L 47/125 |
| 2006/0179071 A1* | 8/2006 | Panigrahy | G06F 16/9014 |
| 2010/0185680 A1 | 7/2010 | Gilboa | |

(Continued)

OTHER PUBLICATIONS

U.S. Appl. No. 15/194,312, "Non-Final Office Action", dated Dec. 29, 2017, 20 pages.

(Continued)

*Primary Examiner* — Phirin Sam
(74) *Attorney, Agent, or Firm* — Kilpatrick Townsend & Stockton LLP

(57) ABSTRACT

Disclosed herein are techniques for classifying input network packets evenly into a plurality of classes. An apparatus includes an input port configured to receive a plurality of network packets. The apparatus also includes processing logic configured to receive the plurality of network packets from the input port and classify each packet of the plurality of network packets. For each packet, whether a condition is met is determined, a most recently used hash operation is selected when the condition is not met or a new hash operation is selected when the condition is met; and the selected hash operation is performed on the packet using at least a portion of the packet as an input value to classify the packet. The most recently used hash operation and the new hash operation are configured to classify packets having the same input value into different classes.

20 Claims, 7 Drawing Sheets

(56) References Cited

U.S. PATENT DOCUMENTS

| | | |
|---|---|---|
| 2010/0316053 A1 | 12/2010 | Miyoshi et al. |
| 2011/0116503 A1 | 5/2011 | Balachandran et al. |
| 2011/0249676 A1* | 10/2011 | Singh .................. H04L 49/15 370/395.32 |
| 2012/0170575 A1 | 7/2012 | Mehra |
| 2012/0233349 A1 | 9/2012 | Aybay |
| 2014/0075147 A1* | 3/2014 | Stark .................. G06F 9/467 711/205 |
| 2014/0092738 A1* | 4/2014 | Grandhi ............. H04L 47/52 370/235 |
| 2014/0115167 A1* | 4/2014 | Roitshtein ........... H04L 47/125 709/226 |
| 2014/0160934 A1* | 6/2014 | Roitshtein ........... H04L 47/125 370/235 |
| 2014/0258644 A1* | 9/2014 | Stark .................. G06F 9/467 711/149 |
| 2015/0215213 A1 | 7/2015 | Sundaram et al. |
| 2017/0163575 A1 | 6/2017 | Wang et al. |

OTHER PUBLICATIONS

U.S. Appl. No. 15/194,312 , "Notice of Allowance", dated Jun. 22, 2018, 9 Pages.

\* cited by examiner

NETWORK TRAFFIC LOAD BALANCING USING ROTATING HASH

CROSS REFERENCE TO RELATED APPLICATIONS

This application is a continuation of U.S. Non-Provisional patent application Ser. No. 15/194,312, filed Jun. 27, 2016, issued as U.S. Pat. No. 10,103,992 on Oct. 16, 2018, and entitled "NETWORK TRAFFIC LOAD BALANCING USING ROTATING HASH," the content of which is herein incorporated by reference in its entirety.

BACKGROUND

In a network, data packets may be processed by a plurality of processing elements or travel through a plurality of transmission paths. It is often desirable that data packets from a single flow, such as a transmission control protocol (TCP) flow, are processed or delivered in order. It is also desirable that data packets from all flows are distributed evenly to the processing elements or transmission paths such that no processing units or transmission paths are overloaded or congested.

BRIEF DESCRIPTION OF THE DRAWINGS

Various embodiments in accordance with the present disclosure will be described with reference to the drawings, in which.

DETAILED DESCRIPTION

Figure 1:
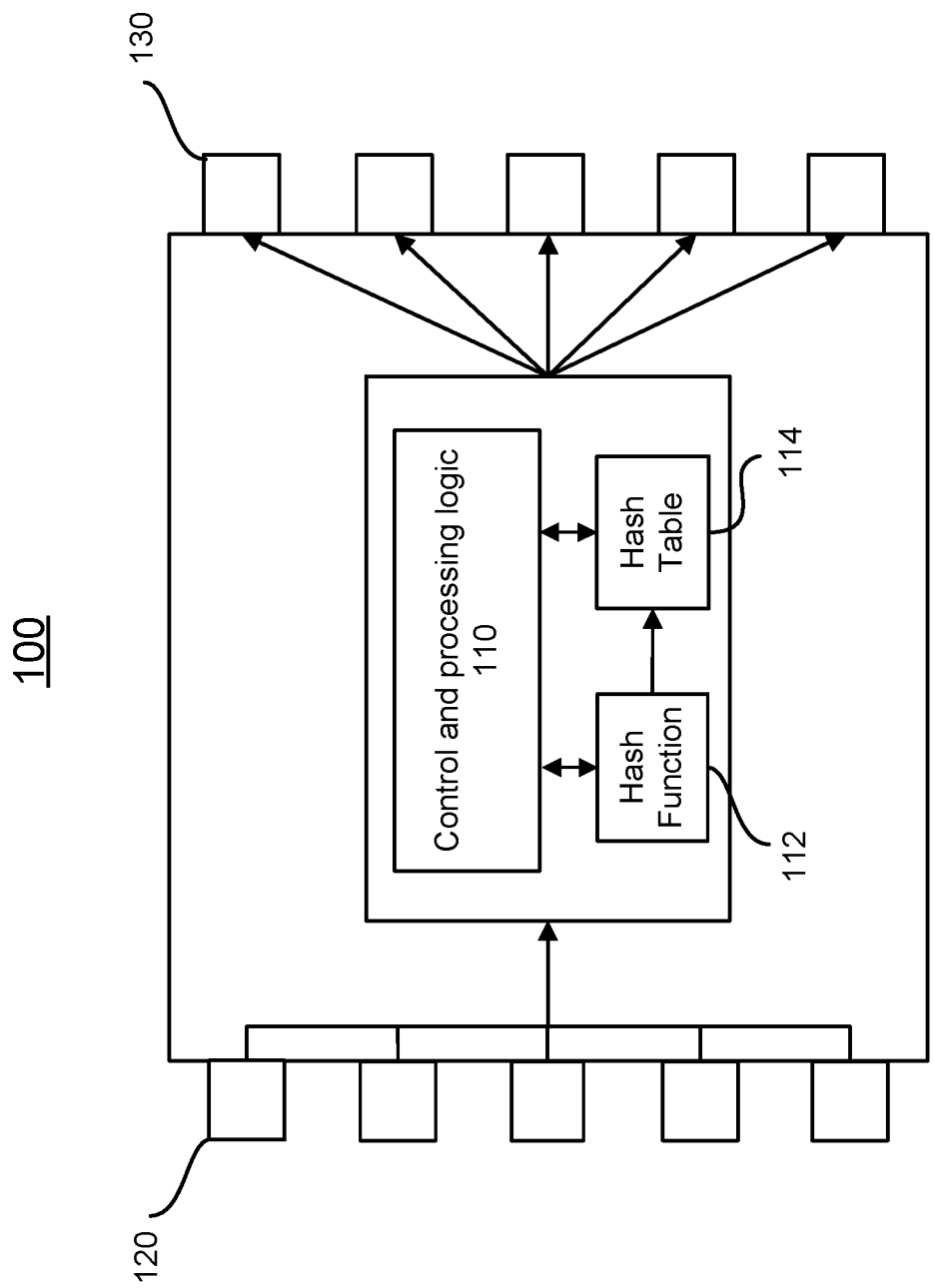
FIG. 1 is a block diagram of an example network device for distributing network packets.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Network traffic may be distributed across network hardware elements, such as processing elements or routers, using different techniques. One such technique is to perform a hash function on incoming network packets and use the results of the hash function to determine the network hardware elements for the packets. However, the incoming network packets from different network flows may not be hashed uniformly, and thus may cause uneven distribution of workload on the network hardware elements. Another technique is the complete random distribution or round-robin distribution of incoming network packets to the network hardware elements. This technique may cause out-of-order processing or delivery for network packets in network flows such as TCP flows, and/or the exchanging of state information of a network flow between the network hardware elements. A third technique is using a work-conserving scheduler to distribute packets to the network hardware elements with the least load. This technique may also cause out-of-order processing and delivery of packets in a network flow, such as a TCP flow.

Techniques disclosed herein may distribute network packets to processing elements or transmission paths more evenly while reducing out-of-order network packet processing or delivery. More specifically, a hash operation for network packet distribution may be reconfigured dynamically to classify network packets from a same flow into different classes. Based on the classification, the network packets may be sent to different network hardware elements, such as processing elements, network ports, or network connections, at different times. Alternatively, the network packets may be tagged based on the classification, or routed to different internal buses based on the classification.

As used herein, a flow, a network flow, or a data flow generally refers to a stream of associated network packets, in some cases, traversing the network in order. In a network environment, a user application on a source endpoint may desire to send a user application data stream to a destination endpoint through the network. The data may be one or more messages, one or more commands, or one or more transactions. In some cases, the source endpoint and the destination endpoint may each have a unique Internet protocol (IP) address. In such cases, a user application data stream intended to be transferred from a source IP address to a destination IP address in a single TCP or user datagram protocol (UDP) connection may be referred to as a data flow, a network flow, or a flow. In some other cases, multiple endpoints may share an IP address, and user application data streams between endpoints can thus be multiplexed in an IP-level data stream between a pair of source and destination IP addresses. In these cases, user application data streams from the multiple endpoints intended to be transferred from a source IP address to a destination IP address in a single TCP or UDP connection may be referred to as a data flow, a network flow, or a flow, where the source IP address is shared by multiple endpoints. In some other cases, an endpoint may have multiple IP addresses and a user application data stream may be intended to be sent through multiple paths using the multiple IP addresses. In these cases, each part of the user application data stream, which is intended to be transferred from a source IP address to a destination IP address in a single TCP or UDP connection, may be referred to as a data flow, a network flow, or a flow.

As also used herein, a network connection, a path, or a network path generally refers to a route that a network packet takes through a network between two IP addresses.

Network packets may be distributed across network hardware elements, such as processing units or network paths, using different techniques. For example, incoming network packets may be distributed to the network hardware elements randomly. In this way, the load on the network hardware elements may be distributed evenly over a longer period of time. However, different network hardware elements may have different workloads, latencies, bandwidths, or computing capacity. Therefore, network packets from a same network flow but distributed to different network hardware elements may experience different delays and may be processed or delivered in an order different from the order in which they are received. Furthermore, network hardware elements that are handling network packets from a same flow, such as processing elements, may need to exchange state information of the flow frequently because the network packets from a same network flow may be randomly distributed to different network hardware elements.

Another technique for distributing network load is a round-robin load balancing technique. In round-robin load balancing, a round-robin load balancer forwards the network packets to network hardware elements according to an order of a list of network hardware elements. For example, a first packet may be forwarded to a first network hardware element, a second packet may be forwarded to a second network hardware element, and so on. After an incoming packet is forwarded to a network hardware element at the end of the list, the load balancer loops back and goes down the list again in the same order. Therefore, the next incoming packet is forwarded to the first network hardware element, the packet after that is forwarded to the second network hardware element, and so on. The round-robin load balancing technique does not always result in even or efficient distribution of network load either, because many round-robin load balancers assume that all network hardware elements are the same, for example, all currently up, all handling the same load, all having same bandwidth and latency, and all with the same storage and computing capacity, which may not be the case in many situations. Thus, as in the random distribution technique, the round-robin load balancing technique may also cause out-of-order processing or delivery of network packets for a flow such as a TCP flow, or the frequent exchanging of state information of a given TCP flow between network processing elements that receive network packets from the TCP flow.

A work-conserving scheduler may also be used to distribute network load to network hardware elements with the least load such that the load on the network hardware elements may be balanced. For example, one example work-conserving scheduler design is a deficit weighted round robin (DWRR) scheduler, where a deficit counter (token) is maintained for each queue that may receive distinct treatment. A queue may be maintained for a network flow. The deficit counter may indicate the remaining capacity available to process data in the queue. If the deficit counter for a queue is greater than zero, the queue may be eligible to send network packets. Network packets may be processed from each eligible queue in a round robin manner. To provide differing weights to the queues, the amount of data credited to each queue may vary. An alternative to DWRR is to use a timestamp instead of a deficit counter for each queue. A timestamp for each queue can be initially set to zero and then incremented as network packets are processed from the queue. Network packets can be processed from the queue with the minimum timestamp. These techniques may also cause out-of-order network packet processing or delivery for TCP flows, and frequent exchanging of state information of a given TCP flow between different network hardware elements.

Another technique for distributing network packets uses a hash operation, which performs a hash function on an incoming network packet using at least a portion of the header of the network packet, and then use the result of the hash function to search in a hash table to find corresponding information regarding where to distribute the network packet.

FIG. 1 is a block diagram of an example network device 100 for distributing network packets using a hash operation on the incoming network packets. Network device 100 may include a plurality of input ports 120 and a plurality of output ports 130. Incoming network packets may be received from one or more input ports 120 and sent to a control and processing logic circuit 110. Control and processing logic circuit 110 may send the incoming network packets or the headers of the incoming network packets to a hash function circuit 112. Hash function circuit 112 may perform a hash function on an incoming network packet using at least a portion of the header of the network packet. A hash function is a function that can be used to map data of arbitrary size to data of fixed size. The hash function can map a search key to an index which indicates where the corresponding entry is stored in a hash table. The values returned by a hash function may be referred to as hash values, hash codes, hash sums, or simply hashes. Multiple different keys may be mapped to a same hash value. The hash function may be any suitable hash function, such as a Toeplitz hash function. Hash function circuit 112 may perform the hash function using, for example, the flow identifier, the source IP address, the destination IP address, the source port, or the destination port associated with the packet, or any combination thereof. The hash value generated by hash function circuit 112 for an incoming network packet can be used to index into a hash table 114.

Hash table 114 may include a plurality of entries, where each entry may include a field indicating an output port for the network packet. Output ports 130 may be connected to various network hardware elements, such as processing elements (e.g., CPUs), network routers, or physical network connections. Thus, by selecting different output ports for network packets from different network flows, network packets from different network flows may be distributed to different network hardware elements.

Figure 2:
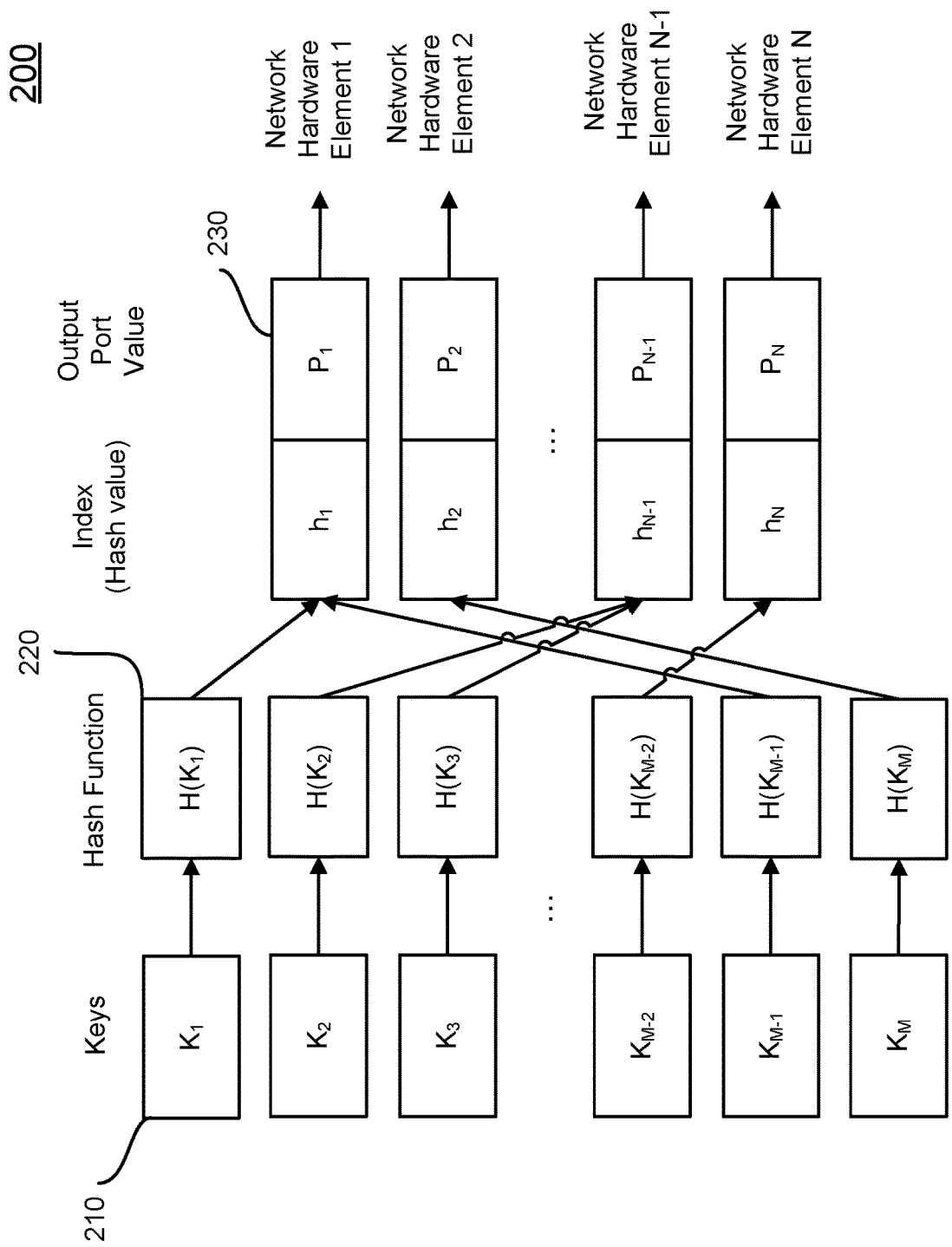
FIG. 2 is a block diagram illustrating an example of network packet distribution using a hash function and a hash table, according to one embodiment of this disclosure.

FIG. 2 is a block diagram 200 illustrating an example of network packet distribution using a hash function and a hash table, according to one embodiment of this disclosure. As described above, information in a network packet, such as the flow identifier, the source IP address, the destination IP address, the source port, the destination port, or any combination thereof, may be used as a key 210 to feed a hash function 220. The hash value from hash function 220 may then be used as an index to search in a hash table 230. Hash table 230 may include a plurality of entries, where each entry may be associated with a hash value or a corresponding index number for searching in hash table 230. Each entry in hash table 230 may also include a value field indicating the corresponding output port for the hash value or the index number, such as a number or an identifier of the corresponding output port. Each output port may correspond to a network hardware element.

As shown in FIG. 2, keys 210 ($K_1$-$K_M$) may be information included in the network packets that can identify M different network flows. Keys 210 may be used as inputs to hash function 220. Hash function 220 may determine a hash value based on the inputs, such as keys 210. Hash function 220 may generate a same hash value for different inputs or keys, but may only generate one hash value for one input or key value. For example, the hash values for both key $K_1$ and key $K_{M-1}$ may be $h_1$, and each of keys $K_1$-$K_M$ may only correspond to one hash value. Therefore, M keys may correspond to N hash values, where N is no greater than M. Hash values $h_1$-$h_N$ may be used as indices to identify an entry in hash table 230. Entries in hash table 230 may identify output ports $P_1$-$P_N$ for different network flows. Output ports $P_1$-$P_N$ may correspond to different network hardware elements 1 to N.

Network packets in a same flow may be associated with the same flow identifier, source IP address, destination IP address, source port, and destination port, and therefore may provide same input to the hash function and may be mapped by the hash function to a same entry in hash table 130 or 230, and thus a same output port and a same network hardware element. This may reduce the number of packets that are processed or delivered out-of-order for a same flow because all network packets from a network flow are processed or delivered by a same network hardware element. However, because different network flows may include different numbers of packets, and a hash function may return a deterministic hash value for packets from a same network flow, incoming network packets from different network flows may not be hashed uniformly to the network hardware elements, and thus may cause uneven distribution of workload on the network hardware elements. For example, some network hardware elements may be overloaded, while some other network hardware elements may be idle or lightly loaded.

To more evenly distribute network load while keeping the number of packets being processed or delivered out of order low, a dynamically reconfigurable hash operation may be used. The hash operation may be reconfigured by, for example, changing an input to the hash function, changing an arithmetic operation of the hash function, or changing the value field of the hash table such that a hash value or index number may be associated with different values (e.g., output port numbers) before and after the change to the hash table. The change to the hash operation may be triggered when a predetermined condition is met. In this way, when the predetermined condition is met, network packets from a flow may be directed to a network hardware element different from the network hardware element used for the network packets from the same flow before the predetermined condition is met. The predetermined condition may be set such that the hash operation is only changed as needed or as planned, and thus a number of network packets from a network flow can be directed to a same network hardware element in order. As a result, network packets may be distributed more evenly over time than a typical hash function-based network load distribution technique. At the same time, out-of-order packet processing or delivery may occur less frequently, and less exchange of state information between network hardware elements may be needed.

In some embodiments, the predetermined condition may be set as the number of packets that have been processed by the control and processing circuit in a network device for distributing network load, for example, control and processing circuit 110 of network device 100 in FIG. 1, since the last change in the hash operation. For example, the predetermined condition may be set such that the hash operation is changed after 500 or 1000 packets have been processed since the last change in hash operation. In some embodiments, the predetermined condition may be set as the maximum number of packets that have been directed to a network hardware element since the last change in the hash operation. For example, the hash operation may be changed after at least one of the network hardware elements has received 500 or 1000 packets since the last change in the hash function. In some embodiments, the predetermined condition may be set as the maximum number of packets in a same flow that have been processed since the last change in the hash operation. For example, the hash operation may be changed after 500 or 1000 packets from a same flow have been processed since the last change in the hash function. The numbers used herein are for illustration purposes only. Different numbers may be used in different situations for different applications. In various implementations, a counter may be used to count the number of packets that have been processed or the number of packets that have been directed to a network hardware element. The counter may be reset each time the hash operation is changed.

In various situations, different network packets may include different numbers of bytes of data. For example, some packets may include hundreds of bytes of data, while other packets may include thousands of bytes of data. Thus, the load on a network hardware element may be better indicated by the number of bytes of data, rather than the number of packets. As such, in some implementations, the predetermined condition may be set as the total number of bytes in the network packets that have been processed by the control and processing circuit in a network device for distributing network load, for example, control and processing circuit 110 of network device 100 in FIG. 1, since the last change in the hash operation. For example, the predetermined condition may be set such that the hash operation is changed after 10 KBytes, 100 KBytes or 1 Mbytes of data have been processed since the last change in hash operation. In some embodiments, the predetermined condition may be set as the maximum number of bytes that have been directed to a network hardware element since the last change in the hash operation. For example, the hash operation may be changed after at least one of the network hardware elements has received 10 KBytes, 100 KBytes or 1 MBytes of data since the last change in the hash function. In some embodiments, the predetermined condition may be set as the maximum number of bytes in a same flow that have been processed since the last change in the hash operation. For example, the hash operation may be changed after 10 KBytes, 100 KBytes or 1 MBytes of data from a same flow have been processed since the last change in the hash function. The numbers used herein are for illustration purposes only. Different numbers may be used in different situations for different applications.

In some implementations, the predetermined condition may be set as the time period that has passed since the last change in the hash operation. For example, the hash operation may be changed every 1 millisecond (ms), every 5 ms, every 10 ms, or longer.

In some implementations, the predetermined condition may be set as an input packet rate or input data rate from one or more input ports. For example, if input packets are received from one or more input ports at a rate of over 1000 (1 K), 10 K, 100 K, 1 million, or more packets per second, the hash operation may be changed. Alternatively, the hash operation may be changed if input packets are received from one or more input ports at a data rate of over, for example, 10 KBytes, 100 KBytes, 1 MBytes, or more bytes per second.

In some implementations, the hash operation may be changed adaptively depending on the load on the network hardware elements. For example, if the number of network packets to be processed by one network hardware element is more than a threshold number, or the wait time or latency at a network hardware element is longer than a threshold value, the hash operation may be changed. In some implementations, once a hash operation is changed, the hash operation may not be changed within a cooling period, such as 1 ms, 5 ms, 10 ms, or longer.

In some implementations, the hash operation may be changed at a request of a network hardware element when, for example, the network hardware element is overloaded, such as when the number of network packets to be processed by the network hardware element is more than a threshold number, or the wait time or latency at a network hardware element is longer than a threshold value. In some implementations, the hash operation may be changed at a request of a network hardware element when the network hardware element is lightly loaded, for example, when the number of network packets to be processed by the network hardware element is less than a threshold number, or the wait time or latency at a network hardware element is shorter than a threshold value.

In this way, a plurality of packets from a network flow may be processed by a same network hardware element before the hash operation is changed. Thus, out-of-order packet processing or delivery may not occur for the plurality of packets. Furthermore, the exchange of state information between network hardware elements may not be needed when the plurality of packets are processed by the same network hardware element. In addition, because network packets from each network flow may be distributed to multiple network hardware elements, network packets from all network flows may be distributed to the available network hardware elements more evenly.

Control and processing circuit 110 of network device 100 in FIG. 1 may include a timer, a clock, a clock counter, one or more packet counters, or one or more data byte counters to determine whether the predetermined condition is met.

As described above with respect to FIG. 2, a hash operation may use various inputs to the hash function, different hash functions, and different hash tables. Thus, the hash operation may be changed by changing at least one of the hash function input, the hash function, or the content of the hash table, when the predetermined condition as described above is met. The following sections describe some example changes to the hash operation in order to change the mapping of network packets from a network flow to different network hardware elements. Other changes to the hash operation may also be used in order to change the mapping of network packets from a network flow to different network hardware elements.

Figure 3:
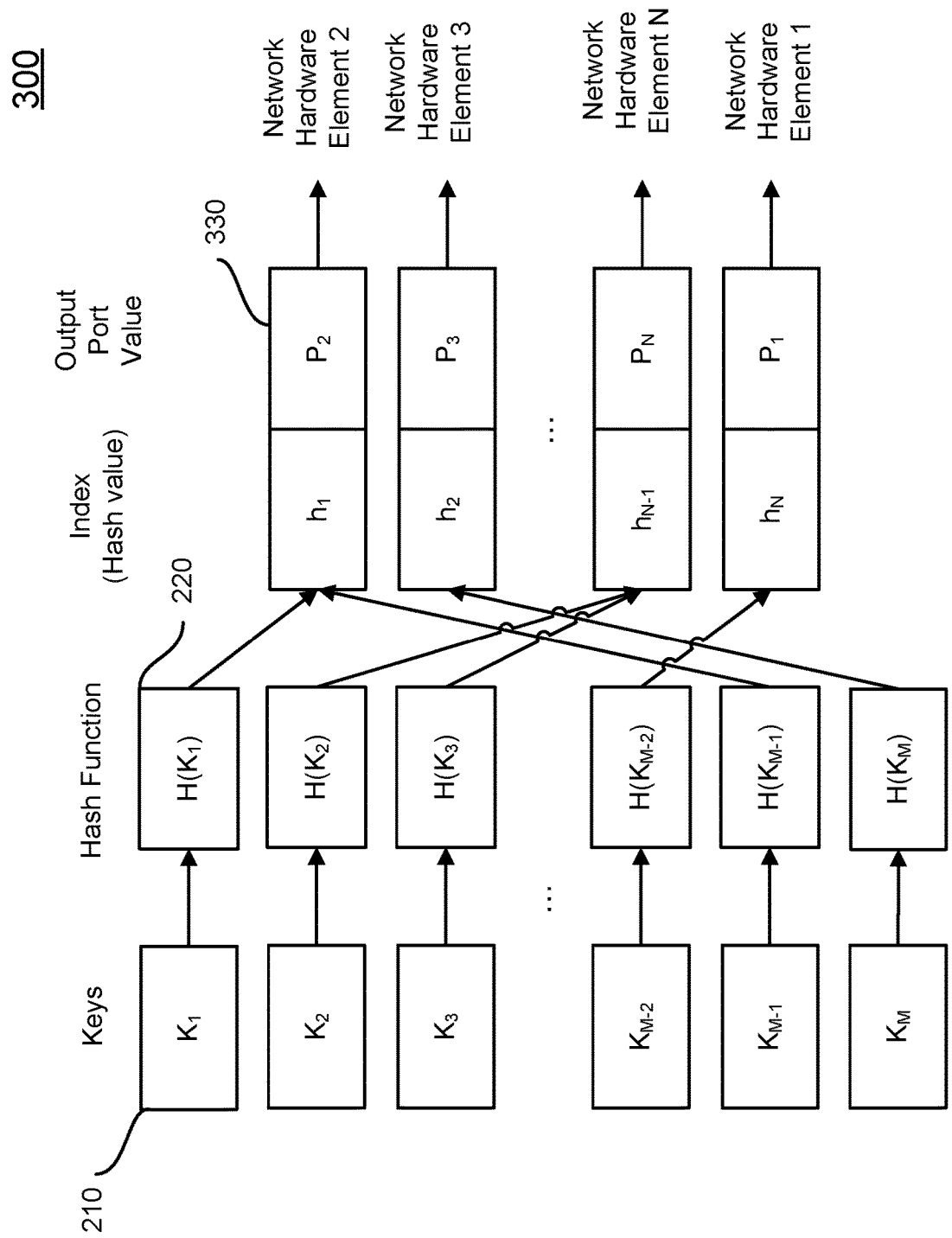
FIG. 3 is a block diagram illustrating an example of network packet distribution using a hash function and a reconfigurable hash table, according to one embodiment of this disclosure.

FIG. 3 is a block diagram 300 illustrating an example of network packet distribution using a hash function and a reconfigurable hash table, according to one embodiment of this disclosure. As in FIG. 2, keys 210 ($K_1$-$K_M$) may be information included in the network packets that can identify M different network flows. Keys 210 may be used as inputs to Hash function 220. Hash function 220 may determine a hash value based on the inputs, such as keys 210. Hash values $h_1$-$h_N$ may be used as indices to identify an entry in hash table 330, which may be reconfigured to be different from hash table 230 of FIG. 2. For example, rather than associating with output port $P_1$ as in hash table 230, hash value $h_1$ may be associated with output port $P_2$ in hash table 330. Similarly, in hash table 330, hash value $h_2$ may be associated with output port $P_3$ rather than $P_2$; hash value $h_3$ may be associated with output port $P_4$ rather than $P_3$; . . . and hash value $h_N$ may be associated with output port $P_1$ rather than $P_N$. In other words, the value field indicating the corresponding output port for the hash value in hash table 330 is rotated relative to the value field in hash table 230 by one entry. Because output ports $P_1$-$P_N$ are coupled to network hardware elements 1-N, respectively, hash values $h_1$, $h_2$, . . . $h_{N-1}$, and $h_N$ are now associated with network hardware elements 2, 3, . . . N, and 1, respectively.

If, for example, network packets from different network flows are distributed using the hash operation illustrated in FIG. 2 at a certain time, where network packets that are mapped to hash value $h_1$ by hash function 220 are processed by network hardware element 1; network packets that are mapped to hash value $h_2$ by hash function 220 are processed by network hardware element 2; and so on. After a predetermined condition as described above is met, the hash table used in the hash operation may be changed from hash table 230 to hash table 330 as illustrated in FIG. 3. As a result, network packets that are mapped to hash value $h_1$ by hash function 220 may now be processed by network hardware element 2, rather than network hardware element 1; network packets that are mapped to hash value $h_2$ by hash function 220 may be processed by network hardware element 3, rather than network hardware element 2; and so on. Thereafter, when the predetermined condition as described above is met again, a new hash table with the value field rotated by another entry may be used. Thus, network packets that are mapped to hash value $h_1$ by hash function 220 may now be processed by network hardware element 3, rather than network hardware element 2; network packets that are mapped to hash value $h_2$ by hash function 220 may be processed by network hardware element 4, rather than network hardware element 3; and so on. In this way, the network packets from various network flows may be distributed more evenly to the network hardware elements over a longer period of time.

In the example shown in hash table 330 of FIG. 3, the values in the value field indicating the corresponding output ports for the hash values are rotated by one entry in each hash operation change. However, it is understood that the values in the value field in the hash table may be rotated by more than one entry in each hash operation change. For example, in each hash operation change, the values in the value field in the hash table may be rotated by 2, 3, 4, 5, or more entries. Thus, if hash value $h_1$ is associated with output port $P_1$ before a hash operation change, after the hash operation change, hash value $h_1$ may be associated with output port $P_3$, $P_4$, $P_5$, $P_6$, or other output port, rather than output port $P_2$.

In some implementations, the hash operation may be changed by performing a different arithmetic operation on the searched value from the value field of the hash table without changing the content of the hash table. For example, if packets including input keys $K_1$ were mapped to a value representing output port P1 in hash table 230 before the hash operation was changed, an arithmetic function, such as an addition of an offset value, may be performed to map the value representing output port P1 in hash table 230 to the value in hash table 230 corresponding to output port P2.

In some implementations, the hash operation may be changed by using a different arithmetic operation in the hash function or on the output of the hash function. For example, if, in one hash operation, the hash value is given by H(K) for a given key K, in another hash operation, the hash value may be given by, for example, H'(K)=H(K)+1. As a result, if packets from a network flow were mapped to hash value $h_1$ and therefore were assigned to network hardware element 1 before a hash operation change, after the hash operation change, packets from the same network flow may be mapped to, for example, hash value $h_2$, and thus may be assigned to, for example, network hardware element 2. In the next hash operation change, the hash value may be given by, for example, H"(K)=H(K)+2, and packets from the same network flow may be mapped to, for example, hash value $h_3$, and thus may be assigned to, for example, network hardware element 3. In this way, packets from a same network flow or packets from different network flows but having the same H(K) may be assigned to different network hardware elements over time.

In some implementations, the arithmetic operation in the hash function or on the output of the hash function may be changed differently. For example, if the hash value in a hash operation is given by H(K), the hash value in the next hash operation may be given by, for example, H'(K)=H(K)+2, H'(K)=H(K)+3, or H'(K)=H(K)+4.

In some implementations, the inputs to the hash function may be changed in order to change the hash operation. For example, a number or a string may be added to the information included in the packets, such as the source IP address, the destination IP address, the source port, or the destination port in the header of each of the packets, before the hash function is applied. In some implementations, the hash function may be modified to change the input values differently. In some implementations, the hash function may use other inputs in addition to the information included in the packets. For example, in some hash functions, a seed may be used in the hash function. For these hash functions, a different seed may be used in the hash function for a different hash operation.

In various embodiments, the change of the hash operation may be implemented in hardware, software, or firmware.

Figure 4:
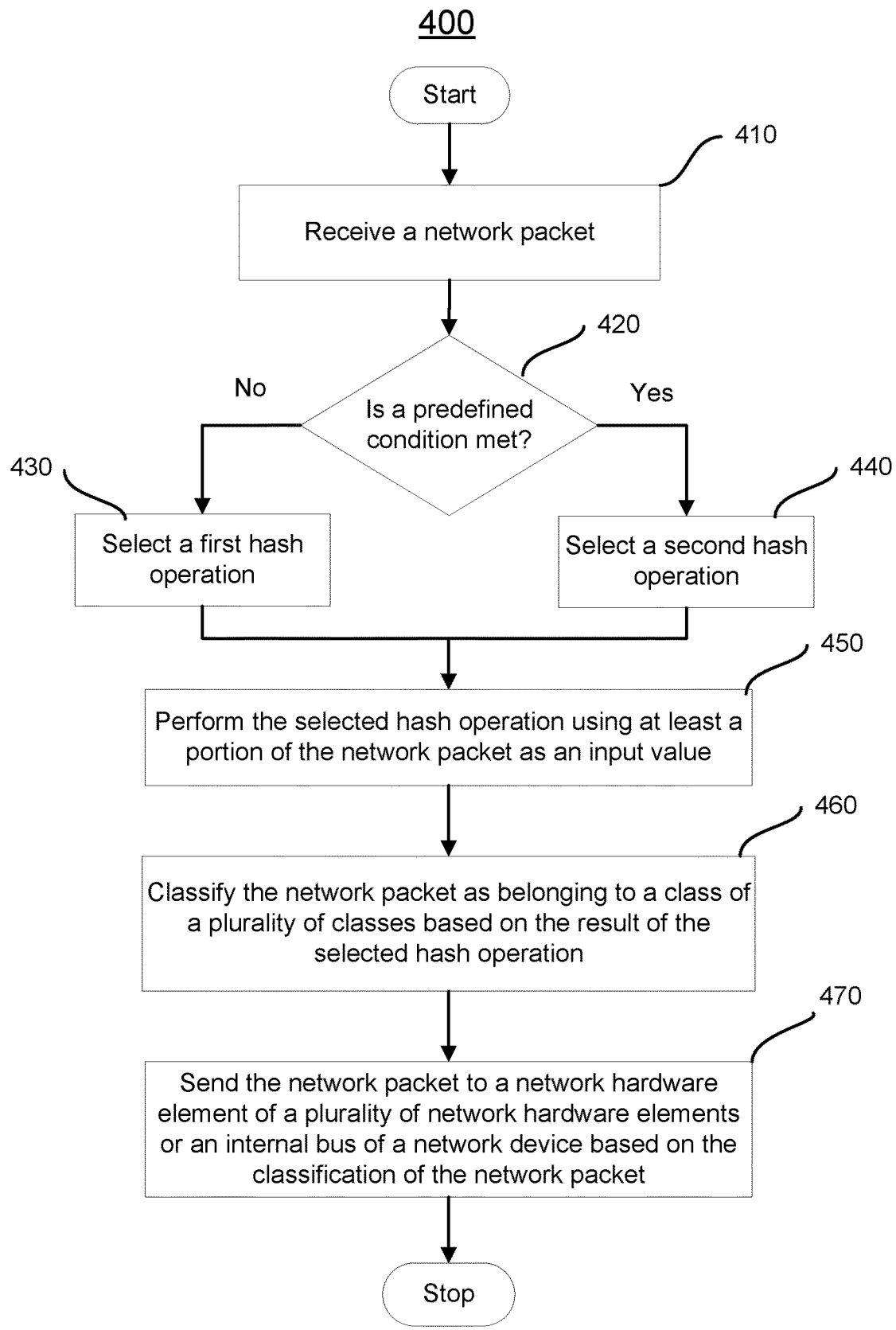
FIG. 4 is a flow chart illustrating an example process of distributing network packets using different hash operations, according to one embodiment of this disclosure.

FIG. 4 is a flow chart illustrating an example process 400 of distributing network packets using different hash operations, according to one embodiment of this disclosure. Some or all of process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
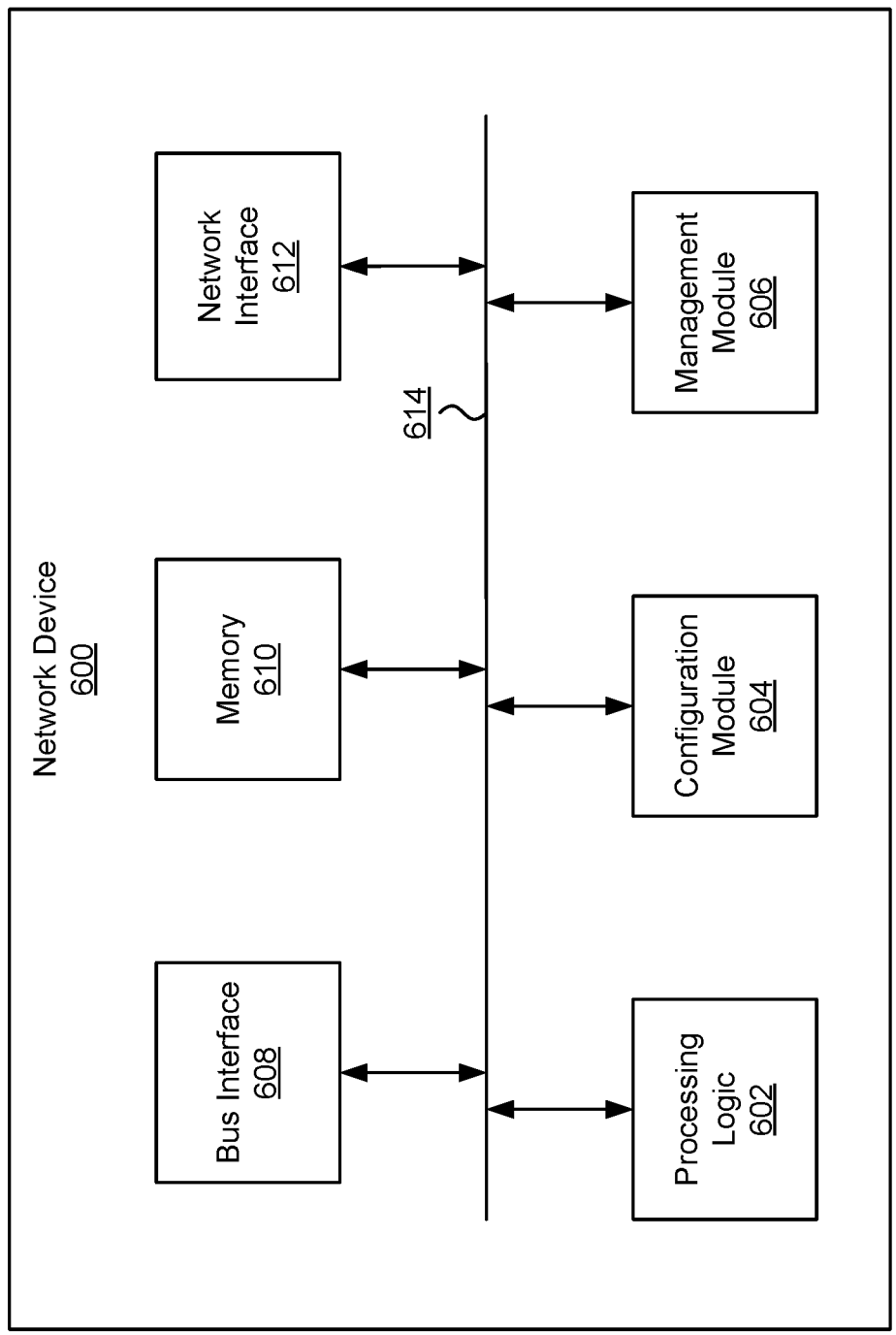
FIG. 6 illustrates an example architecture for features and systems described herein that includes one or more service provider computers and/or a user device connected via one or more networks, according to some embodiments.

At block 410, a network device, such as network device 100 of FIG. 1, may receive a network packet through one or more input ports, such as input ports 120 of FIG. 1. The network packet may include a payload and a header, such as a TCP/IP header. The header of the packet may include information such as source and destination addresses, source and destination ports, the protocol used, an identification, and a sequence number. Packets from a plurality of network flows may be received from the one or more input ports. The network device may put the received packets in one or more queues, and process the received packets based on a predefined order. In various embodiments, means for performing the function at block 410 may include, but are not limited to, for example, input ports 120 of network device 100 as illustrated in FIG. 1 and described in detail above, and network interface 612 as illustrated in FIG. 6 and described in detail below.

At block 420, the network device may determine whether a predetermined condition is met at the time the network packet is processed. As described above, the predetermined condition may be set as the number of packets that have been processed by the network device, the maximum number of packets from a flow that have been processed by the network device, or the maximum number of packets that have been assigned to a network hardware element by the network device, since the last hash operation change. In some embodiments, the predetermined condition may be set as the total number of bytes in the packets that have been processed by the network device, the maximum number of bytes in the packets from a flow that have been processed by the network device, or the maximum number of bytes in the packets that have been assigned to a network hardware element by the network device, since the last hash operation change. In some implementations, the predetermined condition may be set as the time period that has passed since the last hash operation change. In some implementations, the hash operation may be changed adaptively depending on the load on the network hardware elements. In various embodiments, means for performing the function at block 420 may include, but are not limited to, for example, control and processing circuit 110 of network device 100 as illustrated in FIG. 1 and described in detail above, and processing logic 602 as illustrated in FIG. 6 and described in detail below.

At block 430, if the predetermined condition is not met, the network device may select a first hash operation for the packet. The first hash operation may be a most recently used hash operation. The first hash operation may use, for example, a first hash function, a first arithmetic operation on the hash value, a first hash table, and/or a first seed. In various embodiments, means for performing the function at block 430 may include, but are not limited to, for example, control and processing circuit 110 of network device 100 as illustrated in FIG. 1 and described in detail above, and processing logic 602 as illustrated in FIG. 6 and described in detail below.

At block 440, if the predetermined condition is met, the network device may select a second hash operation for the packet. The second hash operation may use, for example, a second hash function, a second arithmetic operation on the hash value, a second hash table, a second seed, or any combination thereof. The second hash function, the second arithmetic operation on the hash value, the second hash table, or the second seed may be different from the first hash function, the first arithmetic operation on the hash value, the first hash table, or the first seed, respectively, as described above. In various embodiments, means for performing the function at block 440 may include, but are not limited to, for example, control and processing circuit 110 of network device 100 as illustrated in FIG. 1 and described in detail above, and processing logic 602 as illustrated in FIG. 6 and described in detail below.

At block 450, the network device may perform the selected hash operation using at least a portion of the packet as an input value. As also described above, the network device may first use a hash function and at least a portion of the packet as the input value to generate a hash value for the packet, and then use the hash value or a result of an arithmetic operation on the hash value to search in a hash table to determine an output value of the hash operation for the packet. In various embodiments, means for performing the function at block 450 may include, but are not limited to, for example, control and processing circuit 110, hash function 112, and hash table 114 of network device 100 as illustrated in FIG. 1 and described in detail above, and processing logic 602 as illustrated in FIG. 6 and described in detail below.

At block 460, the network device may classify the packet as belonging to a class of a plurality of classes based on the output value of the selected hash operation. For example, as described above, the network device may include a plurality of output ports, each of which may be coupled to a network hardware element, such as a processing element, a router or switch, or a network path. In such examples, each class of the plurality of classes may correspond to a different output port that is connected to a different network hardware element. The output of the selected hash operation may identify a class for the packet, and the packet may be classified as belonging to the class of packets that will be sent to the corresponding output port for the class. In some implementations, each class of the plurality of classes may correspond to a different internal bus of the network device, and a packet may be classified as belonging to a class of packets that will be sent to a specific internal bus. In some implementations, each class of the plurality of classes may correspond to a different network hardware element that is not directly connected to the network device, and the packet may be classified and labeled as belonging to a class of packets that should be sent to the network hardware element indirectly. In various implementations, the classification may be done by, for example, adding a label or tag to the packet, associating a metadata with the packet, or putting the packet in a queue. Means for performing the function at block 460 may include, but are not limited to, for example, control and processing circuit 110 of network device 100 as illustrated in FIG. 1 and described in detail above, and processing logic 602 as illustrated in FIG. 6 and described in detail below.

At block 470, the network device may send the network packet to a network hardware element through the identified output port corresponding to the class that the packet belongs to. In some implementations, based on the classification, the packet may be routed to a different internal bus or a network hardware element that is not directly connected the network device. In various embodiments, means for performing the function at block 470 may include, but are not limited to, for example, control and processing circuit 110 and output port 130 of network device 100 as illustrated in FIG. 1 and described in detail above, and processing logic 602 and network interface 612 as illustrated in FIG. 6 and described in detail below.

Figure 5:
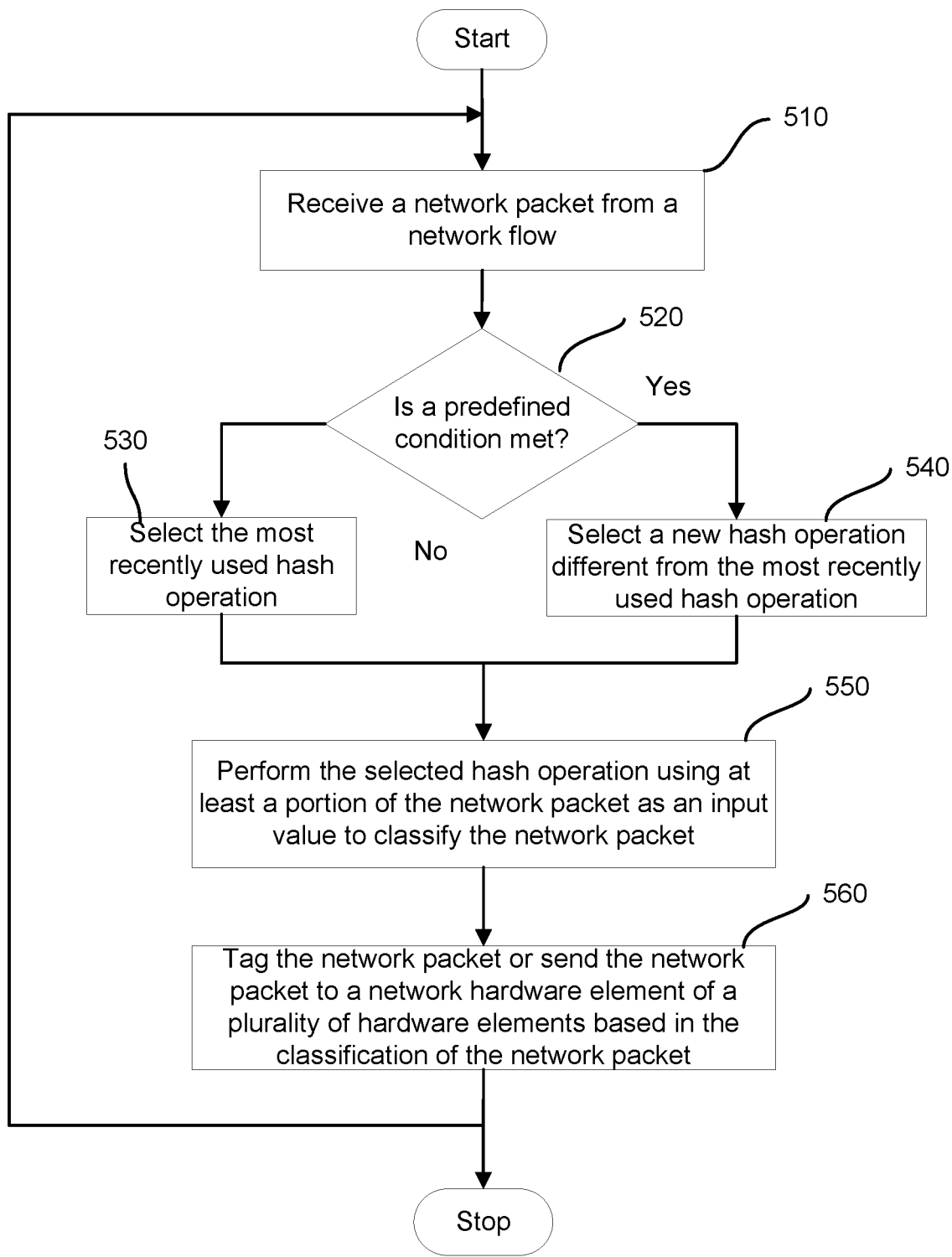
FIG. 5 is a flow chart illustrating an example process of distributing network packets using dynamically reconfigurable hash operations, according to one embodiment of this disclosure.

FIG. 5 is a flow chart illustrating an example process 500 of distributing network packets using dynamically reconfigurable hash operations, according to one embodiment of this disclosure. In FIG. 5, a network device, such as network device 100, may receive a plurality of network packets from a flow and process each network packet by performing operations described with respect to blocks 510-560. In some embodiments, the incoming network packets may be placed in a queue to be processed in a predefined order.

At block 510, the network device may receive a network packet from a network flow through one or more input ports, such as input ports 120 of FIG. 1. The network flow may include tens, hundreds, thousands, tens of thousands, or more of network packets. Each packet may include a payload and a header, such as a TCP/IP header. The header of the packet may include information such as source and destination addresses, source and destination ports, the protocol used, an identification, and a sequence number. At least a portion of the header of each packet from the network flow includes same information that may be used for distributing the network packets to different network hardware elements. In various embodiments, means for performing the function at block 510 may include, but are not limited to, for example, input ports 120 of network device 100 as illustrated in FIG. 1 and described in detail above, and network interface 612 as illustrated in FIG. 6 and described in detail below.

At block 520, after receiving the network packet, the network device may determine whether a predetermined condition is met at the time the packet is processed. The predetermined condition may be set as described above with respect to block 420 of FIG. 4. In various embodiments, means for performing the function at block 520 may include, but are not limited to, for example, control and processing circuit 110 of network device 100 as illustrated in FIG. 1 and described in detail above, and processing logic 602 as illustrated in FIG. 6 and described in detail below.

At block 530, if the predetermined condition is not met, the network device may select a most recently used hash operation for the packet. The hash operation may have different constituents, such as a hash function, an arithmetic operation on the hash value, a hash table, and/or a seed. In various embodiments, means for performing the function at block 530 may include, but are not limited to, for example, control and processing circuit 110 of network device 100 as illustrated in FIG. 1 and described in detail above, and processing logic 602 as illustrated in FIG. 6 and described in detail below.

At block 540, if the predetermined condition is met, the network device may select a new hash operation for the packet. As described above, the new hash operation may be different from the most recently used hash function in the hash function, the arithmetic operation on the hash value, the hash table, the seed, or any combination thereof, such that an input from the header of the network packet to the hash function may be mapped using the new hash operation to a value in the hash table different from a value in the hash table mapped using the most recently used hash operation. For example, in the new hash operation, the value field in the hash table may be rotated in a round-robin manner, the number added to the hash value in the arithmetic operation may be increased by a predefined step, or the inputs to the hash function may be changed by a different value, compared with the most recently used hash operation. In various embodiments, means for performing the function at block 540 may include, but are not limited to, for example, control and processing circuit 110 of network device 100 as illustrated in FIG. 1 and described in detail above, and processing logic 602 as illustrated in FIG. 6 and described in detail below.

At block 550, the network device may perform the selected hash operation using at least a portion of the header of the network packet as an input value to classify the packet. As described above, the network device may first use a hash function and at least the portion of the packet as the input value to generate a hash value for the packet, and then use the hash value or a result of an arithmetic operation on the hash value to search in a hash table to determine an output value of the hash operation for the packet. The packet can then be classified as belonging to a class of a plurality of classes based on the output value of the hash operation for the packet. In various embodiments, a class may correspond to a different output port of the network device that is connected to a different network hardware element, such as a processing element, a router or switch, or a network path. A class may correspond to a different internal bus of the network device. A class may correspond to a different network hardware element that is not directly connected to the network device. In various implementations, the classification may be done by, for example, adding a label or tag to the packet, associating a metadata with the packet, or putting the packet in a queue. In various embodiments, means for performing the function at block 550 may include, but are not limited to, for example, control and processing circuit 110, hash function 112, and hash table 114 of network device 100 as illustrated in FIG. 1 and described in detail above, and processing logic 602 as illustrated in FIG. 6 and described in detail below.

At block 560, the network device may send the network packet to a network hardware element through the identified output port. Alternatively, the network packet may be tagged based on the classification for use by other processing elements connected to the network device directly or indirectly. For example, a label or a metadata indicating the class that the packet belongs to may be added to the packet. In some implementations, the packet may be routed to a different internal bus based on the classification. In various embodiments, means for performing the function at block 560 may include, but are not limited to, for example, control and processing circuit 110 and output port 130 of network device 100 as illustrated in FIG. 1 and described in detail above, and processing logic 602 and network interface 612 as illustrated in FIG. 6 and described in detail below.

The network device may perform the operations described in blocks 510-560 for each network packet from the network flow. For example, the network device may perform the operations described in blocks 510-560 using a first hash operation for a first set of 100 network packets or a first 5-ms period, and distribute the first set of 100 network packets or packets processed within the first 5-ms period to a first network hardware element. The network device may then perform the operations described in blocks 510-560 using a second hash operation for a second set of 100 network packets or a second 5-ms period, and distribute the second set of 100 network packets or packets processed within the second 5-ms period to a second network hardware element. The network device may perform the operations described in blocks 510-560 using a third hash operation for a third set of 100 network packets or a third 5-ms period, and distribute the third set of 100 network packets or packets processed within the third 5-ms period to a third network hardware element. The network device may repeat such operations until all packets from the network flow are processed and distributed to network hardware elements, such as processing elements or routers.

In various implementations, the hash operation may be changed such that the network packets are classified into a plurality of classes evenly such that they may, for example, be distributed evenly among a plurality of network hardware elements. For example, as described above, the hash operation may be changed such that the output of the hash operation changes in a round-robin manner or other manners.

As such, network packets from a network flow may be distributed in sets to multiple network hardware elements rather than a single network hardware element, and thus may avoid overloading a single network hardware element. Furthermore, because a set of consecutive network packets from the same network flow may be distributed to a same network hardware element, the set of consecutive network packets may be processed or delivered in order, and the state information of the network flow may not need to be exchanged between different network hardware elements at least during the period of time that the set of consecutive network packets are processed.

FIG. 5 describes an example process of distributing network packets from a network flow using dynamically reconfigurable hash operations. It is understood that network packets from different network flows may be received by the network device in parallel from one or more input ports and processed as described above with respect to FIG. 5. In this way, network packets from each network flow may be distributed to multiple network hardware elements, and network packets from all network flows may be distributed to the available network hardware elements more evenly.

FIG. 6 illustrates an example of a network device 600 according to some embodiments of this disclosure. Functionality and/or several components of the network device 600 may be used without limitation with other embodiments disclosed elsewhere in this disclosure, without limitations. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, not illustrated here, such as components discussed with respect to the nodes disclosed in FIG. 6. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application-specific integrated circuits (ASICs), field-programmable gate arrays (FPGAs), systems-on-chip (SoCs), systems-in-package (SiPs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 604 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 702.11 wireless protocols, User Datagram Protocol (UDP), ATM, token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 702.11 network, a cellular network, an Infiniband network, etc.

The various components and modules of the network device 600, described above, may be implemented as discrete components, as an SoC, as an ASIC, as an SiP, as an NPU, as an FPGA, as a portion of an SOC, ASIC, SiP, NPU, or FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 7:
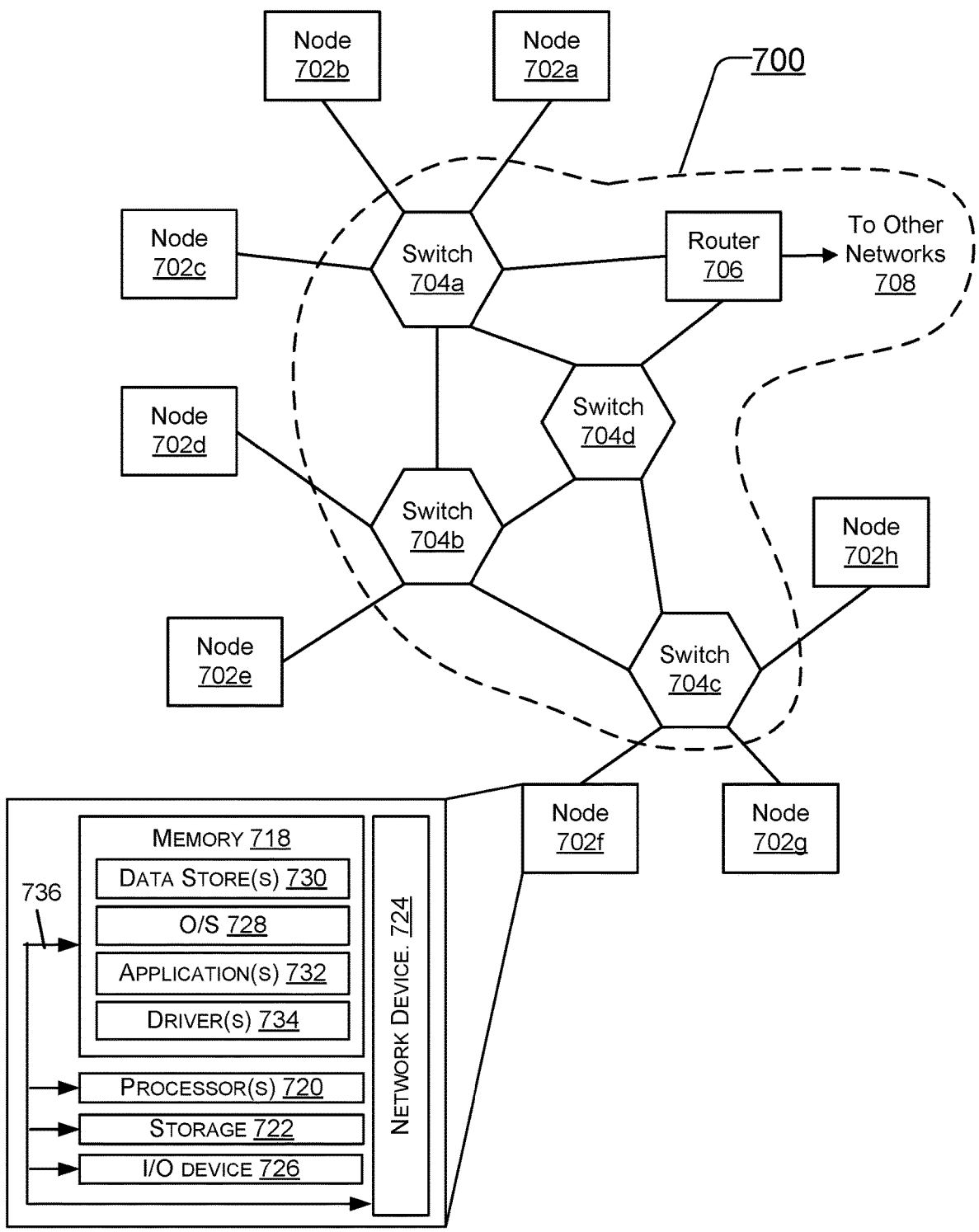
FIG. 7 illustrates aspects of an example environment of a computing system for implementing aspects in accordance with some embodiments.

FIG. 7 illustrates a network 700, depicting various types of network devices 600 of FIG. 6, such as nodes comprising the network device, switches and routers. In certain embodiments, the network 700 may be based on a switched architecture with point-to-point links. As illustrated in FIG. 7, the network 700 includes a plurality of switches 704a-704d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnection (OSI) Reference Model and may support several packet protocols. Switches 704a-704d may be connected to a plurality of nodes 702a-702h and provide multiple paths between any two nodes.

The network 700 may also include one or more network devices 600 for connection with other networks 708, such as other subnets, LANs, wide area networks (WANs), or the Internet, and may be referred to as routers 706. Routers use headers and forwarding tables to determine the best path for forwarding the packets, and use protocols such as internet control message protocol (ICMP) to communicate with each other and configure the best route between any two devices.

In some examples, network(s) 700 may include any one or a combination of many different types of networks, such as cable networks, the Internet, wireless networks, cellular networks and other private and/or public networks. Interconnected switches 704*a*-704*d* and router 706, if present, may be referred to as a switch fabric, a fabric, a network fabric, or simply a network. In the context of a computer network, terms "fabric" and "network" may be used interchangeably herein.

Nodes 702*a*-702*h* may be any combination of host systems, processor nodes, storage subsystems, and I/O chassis that represent user devices, service provider computers or third party computers.

User devices may include computing devices to access an application 732 (e.g., a web browser or mobile device application). In some aspects, the application 732 may be hosted, managed, and/or provided by a computing resources service or service provider. The application 732 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 708. Additionally, the user device(s) may be part of the distributed system managed by, controlled by, or otherwise part of the service provider computer(s) (e.g., a console device integrated with the service provider computers).

The node(s) of FIG. 7 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 732 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s) may communicate with one or more third party computers.

In one example configuration, the node(s) 702*a*-702*h* may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the node(s) 702*a*-702*h*, the memory 718 may be volatile (such as RAM) and/or non-volatile (such as ROM, flash memory, etc.). The memory 718 may include an operating system 728, one or more data stores 730, one or more application programs 732, one or more drivers 734, and/or services for implementing the features disclosed herein.

The operating system 728 may support basic functions of nodes 702*a*-702*h*, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 728 may also be a proprietary operating system.

The data stores 730 may include permanent or transitory data used and/or operated on by the operating system 728, application programs 732, or drivers 734. Examples of such data include web pages, video data, audio data, images, user data, and so on. The information in the data stores 730 may, in some implementations, be provided over the network(s) 708 to user devices 704. In some cases, the data stores 730 may additionally or alternatively include stored application programs and/or drivers. Alternatively or additionally, the data stores 730 may store standard and/or proprietary software libraries, and/or standard and/or proprietary application user interface (API) libraries. Information stored in the data stores 730 may be machine-readable object code, source code, interpreted code, or intermediate code.

The drivers 734 include programs that may provide communication between components in a node. For example, some drivers 734 may provide communication between the operating system 728 and additional storage 722, network device 724, and/or I/O device 726. Alternatively or additionally, some drivers 734 may provide communication between application programs 732 and the operating system 728, and/or application programs 732 and peripheral devices accessible to the service provider computer. In many cases, the drivers 734 may include drivers that provide well-understood functionality (e.g., printer drivers, display drivers, hard disk drivers, Solid State Device drivers). In other cases, the drivers 734 may provide proprietary or specialized functionality.

The service provider computer(s) or servers may also include additional storage 722, which may include removable storage and/or non-removable storage. The additional storage 722 may include magnetic storage, optical disks, solid state disks, flash memory, and/or tape storage. The additional storage 722 may be housed in the same chassis as the node(s) 702a-702h or may be in an external enclosure. The memory 718 and/or additional storage 722 and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718 and the additional storage 722, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 718 and the additional storage 722 are examples of computer storage media. Additional types of computer storage media that may be present in the node(s) 702a-702h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 702a-702h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 702a-702h may also include I/O device(s) 726, such as a keyboard, a mouse, a pen, a voice input device, a touch input device, a display, speakers, a printer, and the like. The node(s) 702a-702h may also include one or more communication channels 736. A communication channel 736 may provide a medium over which the various components of the node(s) 702a-702h can communicate. The communication channel or channels 736 may take the form of a bus, a ring, a switching fabric, or a network.

The node(s) 702a-702h may also contain network device(s) 726 that allow the node(s) 702a-702h to communicate with a stored database, another computing device or server, user terminals and/or other devices on the network(s) 700. The network device(s) 724 of FIG. 7 may include similar components discussed with reference to the network device 600 of FIG. 6.

In some implementations, the network device 726 is a peripheral device, such as a PCI-based device. In these implementations, the network device 726 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 726 may be connected to a computing system using a PCIe interface.

A PCI-based device may include one or more functions. A "function" describes operations that may be provided by the network device 726. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 726 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus comprising:
   an output port configured to output a network packet; and
   a processing circuit configured to:
      receive the network packet;
      determine whether a condition is met;
      select a first hash operation based on determining that the condition is not met or a second hash operation based on determining that the condition is met, wherein the second hash operation is different from the first hash operation;
      perform the selected hash operation using at least a portion of the network packet as an input value;
      select, based on a result of the selected hash operation and from a set of output ports, the output port to route the network packet; and
      route the network packet to the selected output port.

2. The apparatus of claim 1, wherein the condition includes a total number of network packets processed, a total number of bytes processed, a period of time passed after a change of hash operation, an input packet rate, or an input data rate.

3. The apparatus of claim 1, wherein the processing circuit is configured to select the output port by:
   classifying the network packet as belonging to a class in a plurality of classes based on the result of the selected hash operation; and
   selecting the output port based on the classification of the network packet.

4. The apparatus of claim 3, wherein the processing circuit is further configured to, based on the classification of the network packet, send the network packet to one of a plurality of hardware elements, send the network packet to an internal bus, or tag the network packet.

5. The apparatus of claim 4, wherein the plurality of hardware elements include network processing elements, network ports, or network connections.

6. The apparatus of claim 4, wherein the condition includes a total number of network packets processed, a total number of bytes processed, a period of time passed after a change of a hash operation, an input packet rate, a input data rate, a request from a hardware element of the plurality of hardware elements, or a load condition of the plurality of hardware elements.

7. The apparatus of claim 1, wherein the first hash operation is a most recently used hash operation.

8. The apparatus of claim 1, wherein performing the selected hash operation includes:
   applying a hash function corresponding to the selected hash operation to the input value to determine a hash value; and
   searching a hash table based on the hash value to determine the result of the selected hash operation for the network packet.

9. The apparatus of claim 8, wherein:
   the first hash operation and the second hash operation use the same hash function; and
   the first hash operation and the second hash operation perform different arithmetic operations on the hash value before searching the hash table.

10. The apparatus of claim 8, wherein:
    the first hash operation and the second hash operation use the same hash function; and
    the first hash operation and the second hash operation modify the input value from the network packet differently before applying the hash function or use different seed values for the hash function.

11. The apparatus of claim 8, wherein:
    the first hash operation and the second hash operation use a same hash function; and
    the first hash operation and the second hash operation use different hash tables.

12. The apparatus of claim 1, wherein the first hash operation and the second hash operation are selected from a plurality of hash operations.

13. The apparatus of claim 1, wherein the apparatus includes an application-specific integrated circuit (ASIC), a field-programmable gate array (FPGA), a system-on-chip (SoC), a system-in-package (SiP), a network processing unit (NPU), or a portion of an ASIC, FPGA, SoC, NPU, or SiP.

14. A method comprising:
- receiving, at a processing circuit, a network packet;
- determining, by the processing circuit, whether a condition is met;
- selecting, by the processing circuit, a first hash operation based on determining that the condition is not met or a second hash operation based on determining that the condition is met, wherein the second hash operation is different from the first hash operation;
- performing, by the processing circuit, the selected hash operation using at least a portion of the network packet as an input value;
- selecting, by the processing circuit from a set of output ports, an output port to route the network packet based on a result of the selected hash operation;
- routing, by the processing circuit, the network packet to the selected output port; and
- outputting, by the selected output port, the network packet.

15. The method of claim 14, wherein the first hash operation is a most recently used hash operation.

16. The method of claim 14, wherein the condition includes a total number of network packets processed, a total number of bytes processed, a period of time passed after a change of hash operation, an input packet rate, or an input data rate.

17. The method of claim 14, wherein performing the selected hash operation includes:
- applying a hash function corresponding to the selected hash operation to the input value to determine a hash value; and
- searching a hash table based on the hash value to determine the result of the selected hash operation for the network packet.

18. The method of claim 17, wherein, compared with the first hash operation, the second hash operation performs a different arithmetic operation on the hash value, uses a different seed value for the hash function, applies a different hash function, modifies the input value differently before applying the hash function, uses a different hash table, or performs a different arithmetic operation on a searched value from the hash table.

19. The method of claim 14, wherein selecting the output port includes:
- classifying the network packet as belonging to a class in a plurality of classes based on the result of the selected hash operation; and
- selecting the output port based on the classification of the network packet.

20. The method of claim 19, further comprising, based on the classification of the network packet:
- sending the network packet to one of a plurality of hardware elements;
- sending the network packet to an internal bus; or
- tagging the network packet.

* * * * *